United States Patent
Doi

(10) Patent No.: US 6,597,873 B2
(45) Date of Patent: Jul. 22, 2003

(54) LENS HOOD

(76) Inventor: Keiji Doi, 1-4-18 Kozono-Minami, Ayase, Kanagawa 252-1122 (JP)

( * ) Notice: Subject to any disclaimer, the term of this patent is extended or adjusted under 35 U.S.C. 154(b) by 0 days.

(21) Appl. No.: 10/244,436

(22) Filed: Sep. 13, 2002

(65) Prior Publication Data

US 2003/0063909 A1 Apr. 3, 2003

(30) Foreign Application Priority Data

Sep. 28, 2001 (JP) ........................................ 2001-337110
Sep. 5, 2002 (JP) ........................................ 2002-298025

(51) Int. Cl.[7] ............................................... G03B 11/04
(52) U.S. Cl. ........................ 396/534; 396/544; 359/612
(58) Field of Search ............................... 396/534, 544, 396/545; 359/611, 612

(56) References Cited

U.S. PATENT DOCUMENTS

| | | | | |
|---|---|---|---|---|
| 1,848,879 A | * | 3/1932 | Halbasch | 359/612 |
| 3,940,775 A | * | 2/1976 | Bodnar | 396/337 |
| 4,045,117 A | * | 8/1977 | Lerner | 359/612 |
| 4,053,910 A | * | 10/1977 | Bodnar | 396/337 |
| 4,314,280 A | | 2/1982 | Rose | |
| 4,497,549 A | | 2/1985 | Yurdin | |
| 4,875,066 A | | 10/1989 | Rickard | |
| 5,784,208 A | | 7/1998 | Kanno | |

* cited by examiner

Primary Examiner—Russell Adams
Assistant Examiner—Michelle Nguyen

(57) ABSTRACT

A lens hood based on modular structure having at least one adapter module and at least one hood module, where each of the adapter modules is continuously fastened to each of lenses, each of the hood modules has double layer structure for the hood length extension, and any of the hood modules is detachably attachable to any of the adapter modules with an single identical attachment interface in an operation state, and is foldable in a store state.

7 Claims, 8 Drawing Sheets

LENS HOOD

CROSS REFERENCE TO RELATED APPLICATIONS

JP2001-337110 Japan Sep. 28, 2001, and

JP 2002-298025 Japan Sep. 5, 2002 for Prior Foreign Application Benefits

FEDERALLY SPONSORED RESEARCH

Not Applicable

SEQUENCE LISTING OR PROGRAM

Not Applicable

BACKGROUND

1. Field of Invention

This invention relates to lens hoods that are mounted to camera lenses for use.

2. Description of Prior Art

There are widely known various types of lens hoods. One type of lens hoods is a tubular type hood that is mounted on a lens barrel or is screwed into a lens barrel thread. Other type of lens hoods is a panel type hood that comprises a flexible rod with a clamp at one end of the rod and a panel fastened to another end of the rod. In an operation state, the clamp is fixed to a camera body or its lens. Then, the panel is placed at a desired position between a light source and the lens by bending the rod. Other type of lens hoods is a bellow type hood that has a rectangular hood opening and is mounted on a camera or its lens then shields unnecessary light by adjusting the hood length.

In the case of the tubular type hood, a plurality of hoods, which is used for a plurality of lenses that has various focal lengths and barrel diameters, must be required. Therefore, a problem is that it is bulky. As for a light shield capability, a tubular type hood that has a circular hood opening is less effective than a lens hood that has a rectangular hood opening. In the case of the panel type hood, a problem is that it can shield only unnecessary light rays which direct at the panel surface, therefore, whose light shield capability is less effective than that of the tubular type hood or the bellow type hood.

In the case of the bellow type hood, it has an excellent light shield capability. However, a problem is that it has relatively complicated structure and is heavy and bulky, therefore, it requires longer mounting time and its operation is complicated.

As other types of known lens hoods, in which a single hood is capable to use for a plurality of lenses which has various focal lengths and barrel diameters, spring and screw mount type hoods are available. Each of the hoods has a hole with a diameter large enough to mount on various lens barrels. Each of the hoods is mounted on a lens barrel by either spring or screw means. In the spring mount type hood, a problem is that whose mechanical strength for mounting is relatively weak. In the screw mount type hood, a problem is that it is difficult to mount on a lens with precise alignment and the mounting operation is cumbersome.

SUMMARY OF THE INVENTION

An object of the present invention is to solve the above stated problems and provides a lens hood, that is extremely compact for transport, that can be quickly mounted, that offers an easy operation, and that has an excellent light shield capability.

An essence of the present invention is that the lens hood comprising an adapter module having a circular hole through which a lens is continuously fastened, an inner hood further comprising, a plurality of first panels connected each other along adjacent edges in a closed sequence, and front and rear openings, and the inner hood which fits the adapter module for detachable attachment.

Thus, in order to enable a single lens hood to be available for a plurality of lenses having various focal lengths and barrel diameters, first, modular structure, comprising two modules the adapter module and a hood module, is provided. Second, an identical attachment interface between the adapter modules and the hood modules is provided.

Third, it is arranged in such a way that a plurality of the adapter modules is always fastened respectively to a plurality of lenses having various focal lengths and barrel diameters. Thus, any of the hood modules, each of which has the identical attachment interface, can be attached to any of the adapter modules.

The hood module comprises the inner hood and an outer hood. The inner hood further comprises a plurality of the light shielded first panels hingedly connected each other along adjacent edges in the closed sequence. The opening of the inner hood at a lens side, that is a rear side, has the identical attachment interface. Any of the inner hoods is detachably attachable to any of the adapter modules.

The adapter module has the circular hole with a diameter large enough for a lens barrel to be continuously fastened. The adapter module complementary matches the rear opening of the inner hood as the identical attachment interface.

In order to make the hood module attachment operation easy and quick, a plurality of tapered bodies, each bent toward an optical axis and having a tip pointing toward a photographing object side and another end of the tip fastened to each vertex of the adapter module at a radial direction square to the optical axis, is provided to the adapter module.

To make the attachment securer, at least one hood lock is provided to the adapter module. At least one of the hood lock each comprises a first elastic member, at least one lock pin each having an oblique section at a tip and mounted on the first elastic member in a same direction, the first elastic member fastened at the optical axis side of the vertex of the adapter module as at least one of the lock pin each pointing toward a radial direction square to the optical axis and intersecting a plane configured by the vertices with the oblique section exposed to the photographing object side, and at least one of the lock pin each of which pushes an inside wall of the inner hood by the first elastic member when the attachment is made and is released when the first elastic member is pulled back to an opposite direction.

In order to make a hood length variable, the outer hood is provided to the hood module. The outer hood comprises a plurality of second panels connected each other along adjacent edges in the closed sequence, and front and rear openings, and the outer hood which fits the inner hood to make slidable double layer structure. The outer hoods comprises a plurality of the light shielded second panels hingedly connected each other along adjacent edges in the closed sequence. Thus, when the inner hood is securely attached to the adapter module, the outer hood is able to move along the inner hood to change the overall hood length.

In order to make the hood module, which has the double layer structure, foldable, for maintaining a gap between each of the connected adjacent edges of the second panels of the outer hood, a plurality of play members, each of which is provided between each of the connected adjacent edges of the second panels for maintaining the gap as each length of the play members is equal to a thickness of the inner hood in an folded state, is provided.

Next, a plurality of the second panels, each edge length square to the optical axis of which is defined as a perimeter of a contact plane of the inner hood to the outer hood is equal to a perimeter of an inside plane of the outer hood when the attachment is made, is provided. Thus, the hood module is able to be foldable while neatly slidable.

In a folded state, to reduce a total thickness of the hood module, the inner hood further comprises at least one depression each provided on each of the first panels at an outside surface. A space created by the depression can partially absorbs a thickness of an extension adjust. Thus, in a store state, the hood module can be folded for extreme compactness and transportability.

To secure the overall hood length at a desired position during an operation state, at the outer hood, at least one of the extension adjust is provided. At least one of the extension adjust each comprises a long plate, a friction plane at one surface end of the long plate, a rotation axis placed at a center of the long plate, and an elastic member urging the rotation axis to rotate, at least one long hole each of which is placed on each of the second panels square to the optical axis at the lens side, and the rotation ax is pivotally connected at a center of the long hole as the friction plane facing the optical axis as the elastic member functioning with the second panel of the long hole.

Always, at least one of the friction plane each is pressed by the elastic member against an outside surface of the inner hood, thus the outer hood position is secured, however, by applying pressure on another end of the long plate, a frictional contact is disengaged, then the outer hood becomes slidable.

To maximize a light shield capability of a hood, shape of the hood front opening has to match a film aspect ratio for use. For this reason, a plurality of projection members, each provided on each edge of the second panels at the photographing object side, is added to simulate the film aspect ratio.

DESCRIPTION OF THE PREFERRED EMBODIMENT

Figure 1:
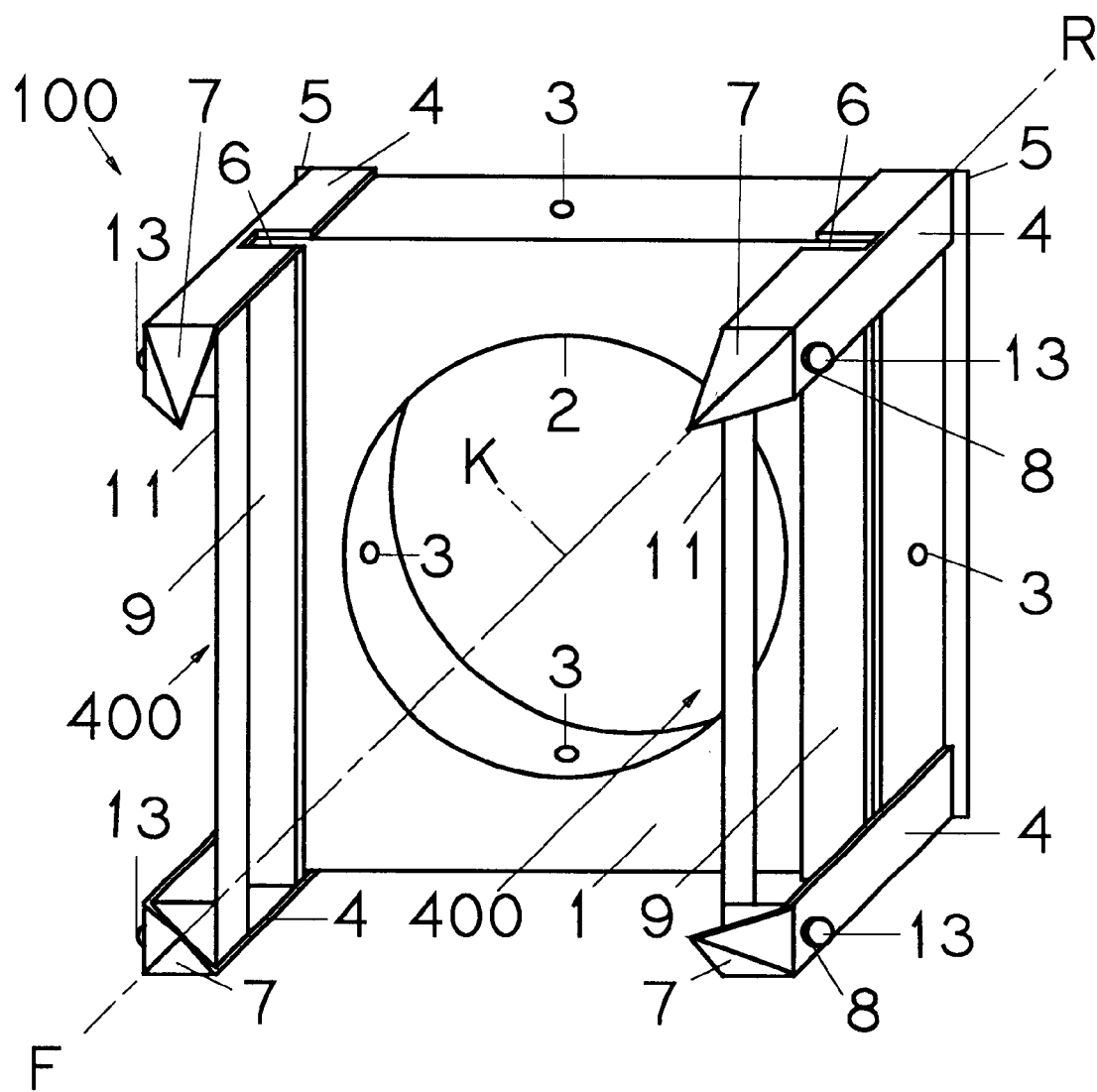
FIG. 1 is a perspective view of the adapter module.

A preferred embodiment of the present invention is described below. FIG. 1 shows a perspective view of an adapter module 100. The adapter module 100 comprises a base 1 and four of hood supports 4.

The base 1 has a circular hole 2 at the center for insertion of a lens barrel front and four screw holes 3 to continuously fasten the adapter module 100 to the lens barrel front. In FIG. 1, from a rear side R to a front side F of an optical axis K, the lens barrel front, which is not shown, is inserted into the circular hole 2, then the adapter module 100 is fastened to the lens barrel by tightening screws through the screw holes 3.

The screws for the screw holes 3 can be made of a material that is relatively softer but workable such as plastic, so that they could prevent the lens barrel from damage.

As an alternative, among a plurality of the adapter modules 100, each diameter of the circular holes 2 can remain in an identical size as large enough for expected lens barrels, then, rings, each of which respectively fills a gap between the inner diameter of the circular hole 2 and a outer diameter of a particular lens barrel, can be provided to each of the adapter modules 100.

As for methods to fasten the adapter module 100 to a lens barrel, it is not necessarily to limit to the method explained above, but a method by unifying the adapter module 100 to a lens board, that is used for a view camera lens for mounting the lens on the camera body, is an alternative. Further more, a method such as unifying the adapter module 100 in a lens is another alternative.

At each of four corners of the base 1, the L-shaped hood support 4 is built in parallel to the optical axis K toward the front side F. Each of the hood supports 4 has enough width and depth to frictionally hold steadily a hood module 200 when attached. In this embodiment, the identical attachment interface configured by four of hood supports 4 is square.

Figure 2:
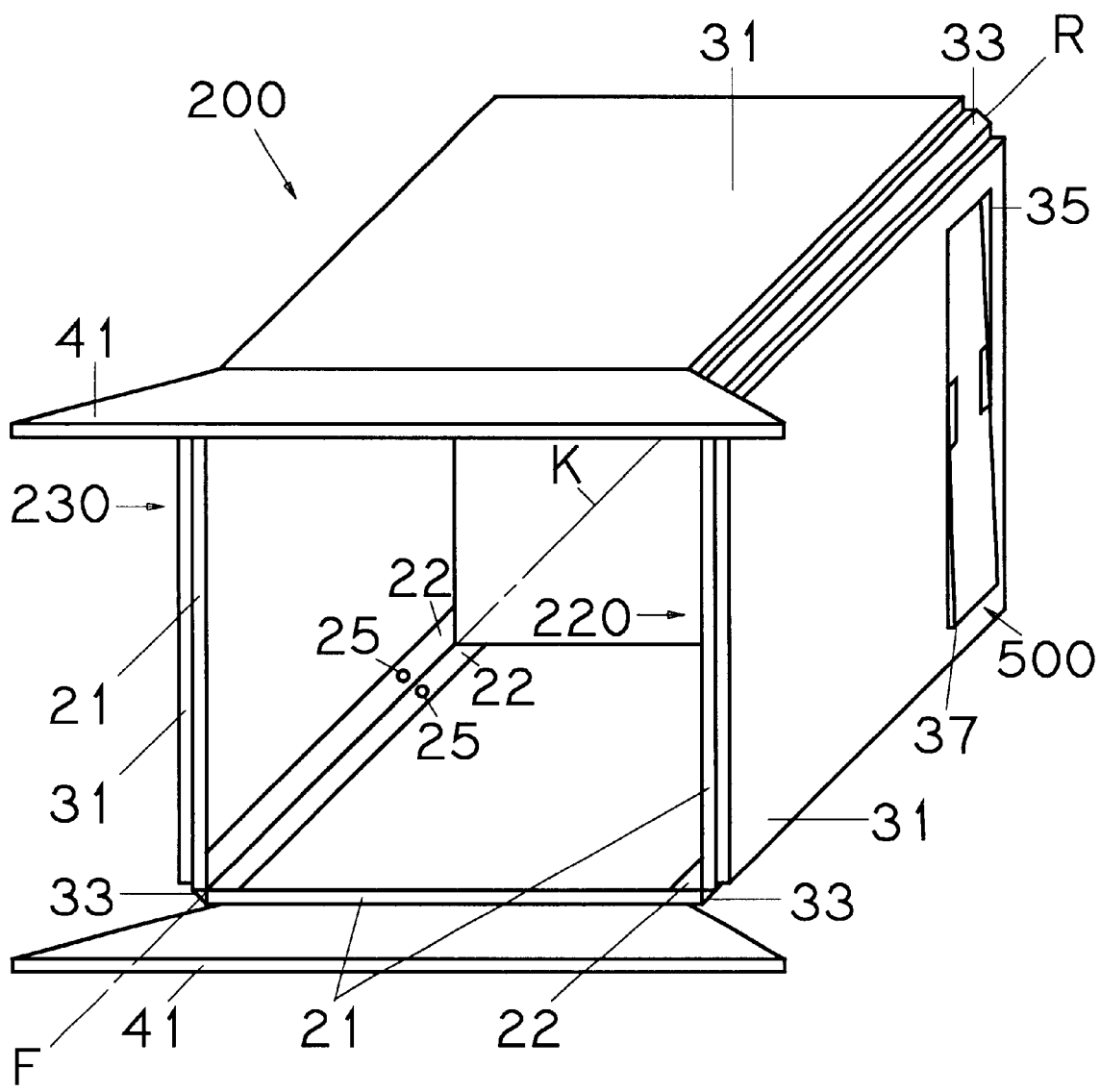
FIG. 2 is a perspective view of the hood module in an open state.

FIG. 2 is a perspective view of the hood module 200 in an open state. The hood module 200 comprises an inner hood 220 and an outer hood 230. Each of extension adjusts 500 is provided to each of side surfaces of the outer hood 230.

Figure 3:
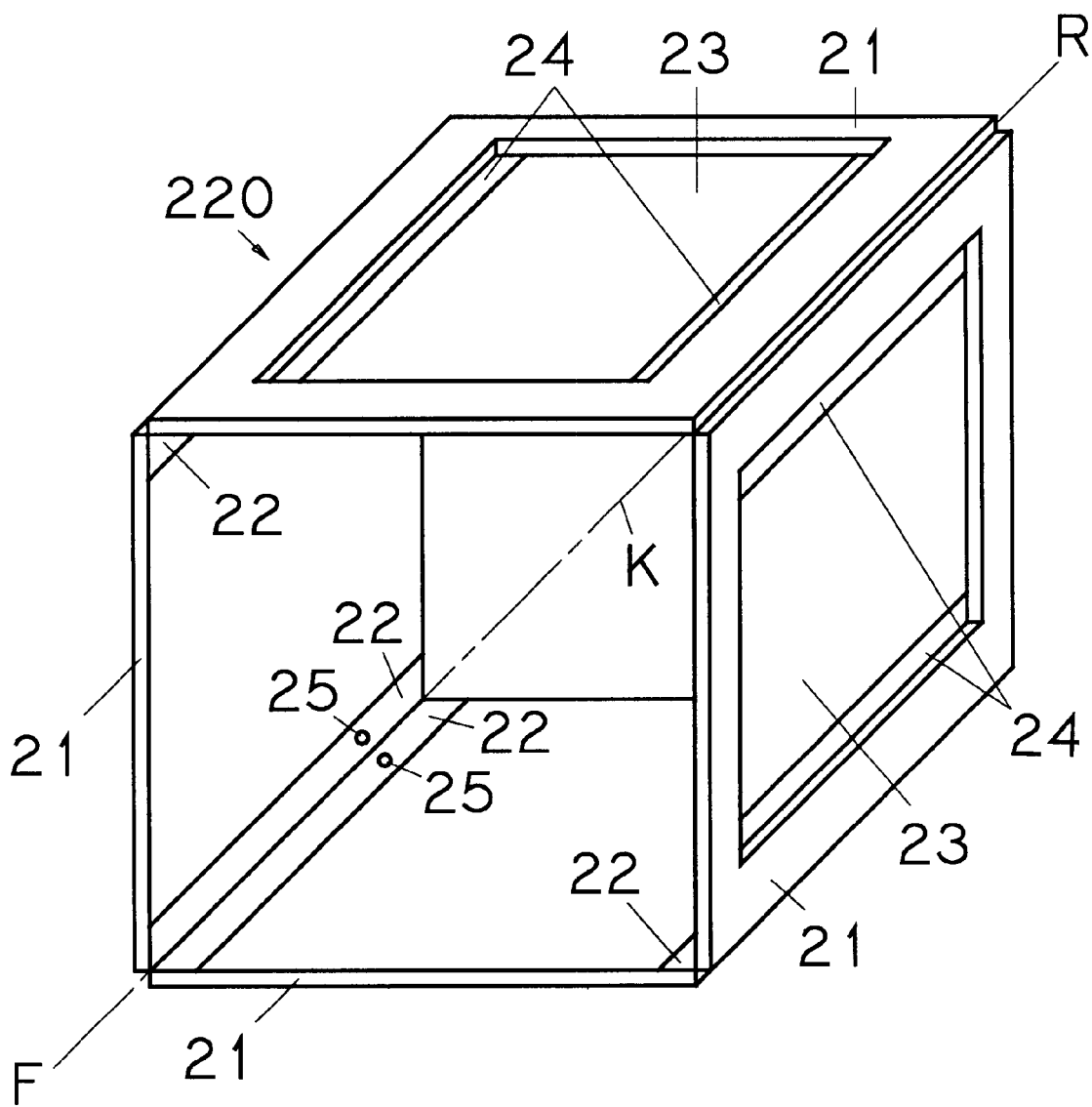
FIG. 3 is a perspective view of the inner hood in an open state.

FIG. 3 is a perspective view of the inner hood 220 in an open state. The inner hood 220 comprises four of light shielded first panels 21 and four of first hinges 22. Each of the panels 21 is respectively connected by each of the hinges 22 from inside each other along adjacent edges in a closed sequence. Thus the inner hood 220 is foldable. Each of the panels 21 is of rectangular shape and is congruent each other.

Openings at the front side F and the rear side R of the inner hood 220 have identical dimensions, and in a squarely opened state, the opening at the rear side R fits four of the hood supports 4 as the identical attachment interface for the detachable attachment. Among a plurality of the inner hoods 220, each of which may be different in hood length, however, any of the inner hoods 220 is detachably attachable to any of the adapter modules 100. In this embodiment, the opening at the rear side R of the inner hood 220 is square.

As an alternative, by using more than four panels, a foldable hood with a different attachment interface shape can also be configured. For example, tubular hoods with openings of a polygon shape such as a hexagon or an octagon are configurable.

As shown in FIG. 1, each of upper two hood supports 4 has a slit 6 for inserting a filter. Each of two flanges 9 is placed along each of vertical edges of the base 1. In this composition, Two of the flanges 9 provide a space for inserting a thin plate member such as a filter or a sheet shape lens cap.

A thin film filter inserted from the slits 6 slides through the space created by the flanges 9 and is held by lower two hood supports 4. After the filter is inserted, the hood module 200 is attached and surrounds the filter. This is effective for protecting the filter from wind and rain for outdoor photography.

For a store state, a thin plate, having an identical size with the-filter but slightly thicker for generating a frictional contact which keeps the panel staying there, can be used as a lens cap.

As shown in the FIG. 1, four of tapered bodies 7, each of which is fastened at each tip of the hood supports 4. Each of the tapered bodies 7 is bent toward the optical axis K as each tip of the tapered bodies 7 points toward the front side F. The tapered bodies 7 act as a guide for the hood module 200 attachment. Thus, when the hood module 200 is being attached, the tapered bodies 7 easily and quickly lead the hood module 200 to the identical attachment interface plane.

Figure 4:
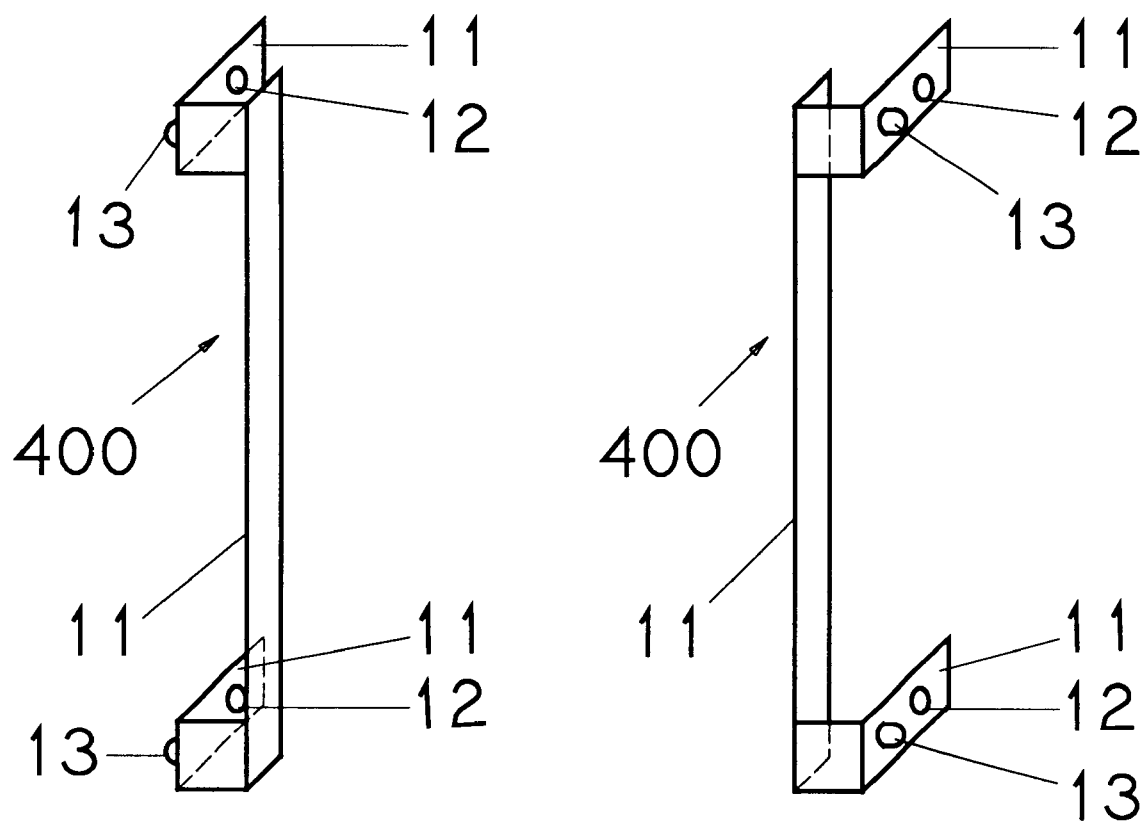
FIG. 4 is a perspective view of the hood locks.

FIG. 4 is a perspective view of hood locks 400. Two of the hood locks 400 are provided on the adapter module 100. The hood lock 400 comprises a first elastic member 11 and a pair of lock pins 13 that are mounted on the both ends of the elastic member 11.

Each of the lock pins 13 is placed toward each of an inside wall of the inner hood 220. Each of the elastic members 11 has a pair of connect holes 12 to be fastened to the adapter module 100. As shown in FIG. 1 and FIG. 4, each of the elastic members 11 is fastened to the hood supports 4 from the optical axis K side. Each of the hood supports 4 has a lock pin hole 8 to permit the lock pin 13 pass through.

Figure 5:
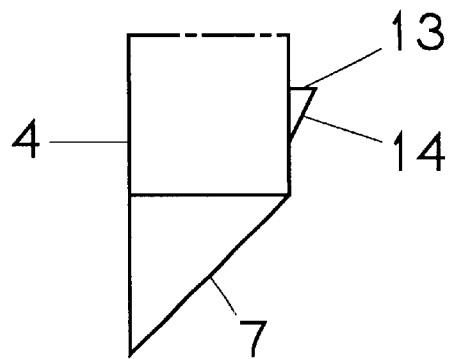
FIG. 5 is a partial top view of the hood support and the hood lock at the upper right portion.
Figure 6:
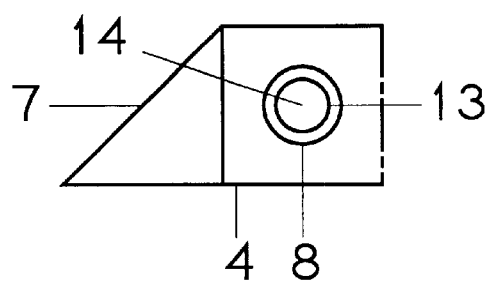
FIG. 6 is a side view of FIG. 5.
Figure 7:
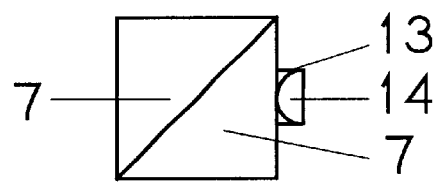
FIG. 7 is a front view of FIG. 5.

FIG. 5 is a partial top view of the hood support 4 and the hood lock 400 at an upper right portion. FIG. 6 is a side view of FIG. 5. FIG. 7 is a front view of FIG. 5. Each tip of the lock pins 13 has an oblique section 14 exposed to the front side F. Further, each of the oblique sections 14 is positioned as intersecting the identical attachment interface plane.

As shown in FIG. 3, At each of the panels 21 at the rear side R of the optical axis K side, two of lock notches 25 are provided. Thus, in total eight of the lock notches 25 are provided for the single inner hood 220. Each position of the lock notches 25 is matched each position of the lock pins 13 when the inner hood 220 is attached to the adapter module 100 in both horizontal and vertical directions.

For the attachment, when the inner hood 220 is being inserted through the identical attachment interface plane formed by the hood supports 4, each of the lock pins 13 is pushed toward the optical axis K side by an inside wall of the inner hood 220, then, is kept to be pushed until each of the lock notches 25 reaches the lock pins 13. When reached, the lock pins 13 are engaged to the lock notches 25 and a securer attachment is complete.

As shown in FIG. 1, the adapter module 100 further comprises two of hood stops 5 placed at right and left edges of the base 1 at the rear side R. Each of the hood stops 5 increases attachment stability by securing edges of the inner hood 220 at the rear side R during an operation state.

In order to enhance rigidity between the adapter module 100 and the hood module 200 during the attachment, a projection frame rigidly built around a periphery of the adapter module 100 in parallel to the optical axis K, which surrounds and interlocks the outside surface edges of the panels 21 at the rear side R, can be added.

For the detachment, by inserting a hand into the hood module 200 from the front opening and by squeezing the elastic members 11 toward the optical axis K, the lock pins 13 are released from the lock notches 25, then, the hood module 200 can be easily and quickly removed from the adapter module 100.

Figure 8:
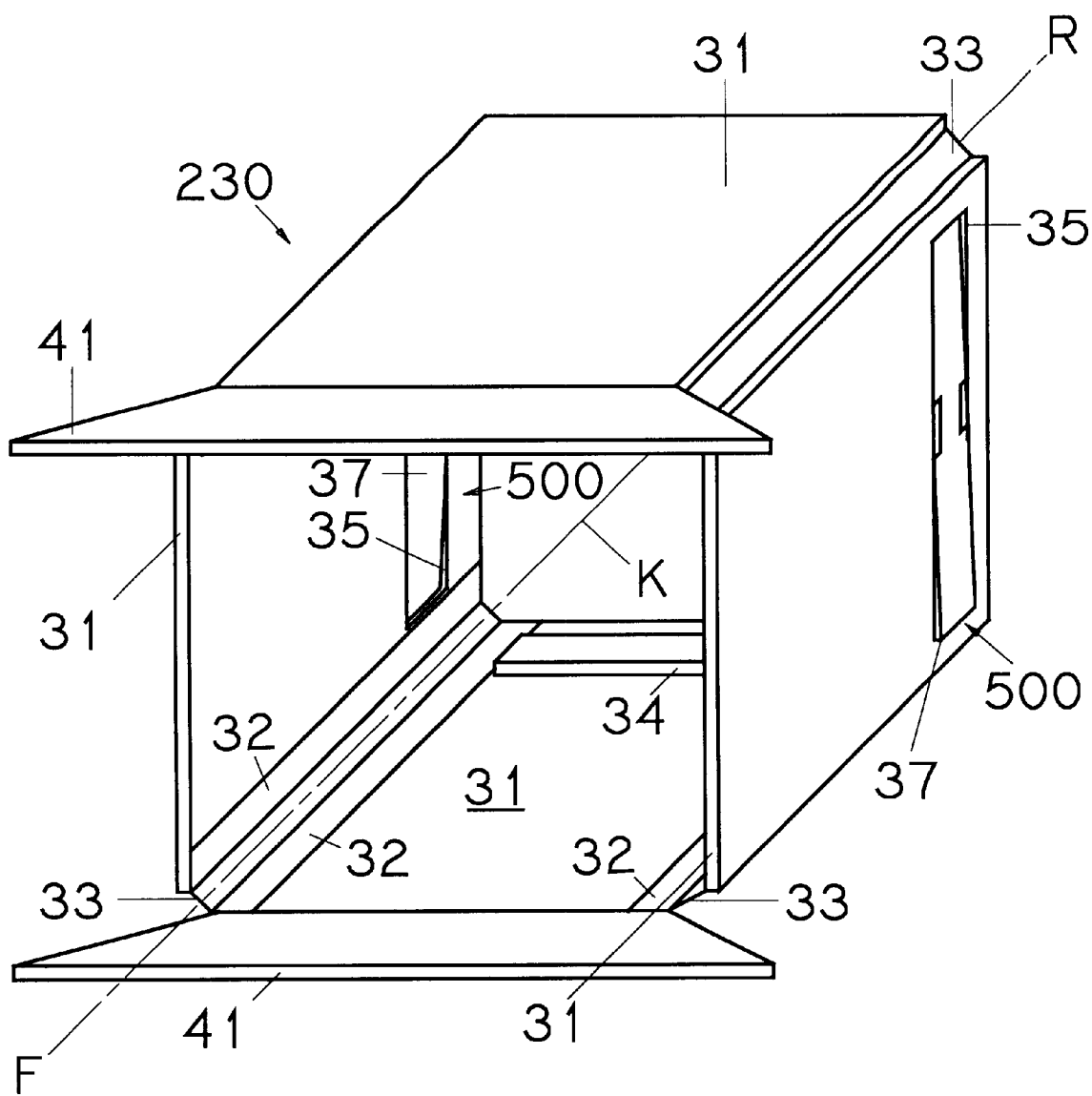
FIG. 8 is a perspective view of the outer hood in an open state.

FIG. 8 is a perspective view of the outer hood 230 in an open state. The outer hood 230 comprises four of light shielded second panels 31 and four of second hinges 32. Each of the panels 31 is respectively connected by each of the hinges 32 from inside each other along adjacent edges in the closed sequence. Thus the outer hood 230 is foldable. Each of the panels 31 is of rectangular shape and is congruent each other.

As shown in FIG. 2, the hood module 200 has double layer structure as the outer hood 230 is inserted by the inner hood 220. The outer hood 230 is dimensioned to fit the inner hood 220 in an open state, thus by sliding the outer hood 230 along the optical axis K on the inner hood 220, the hood length can be extended. A front opening shape of the outer hood 230 is also square.

Figure 9:
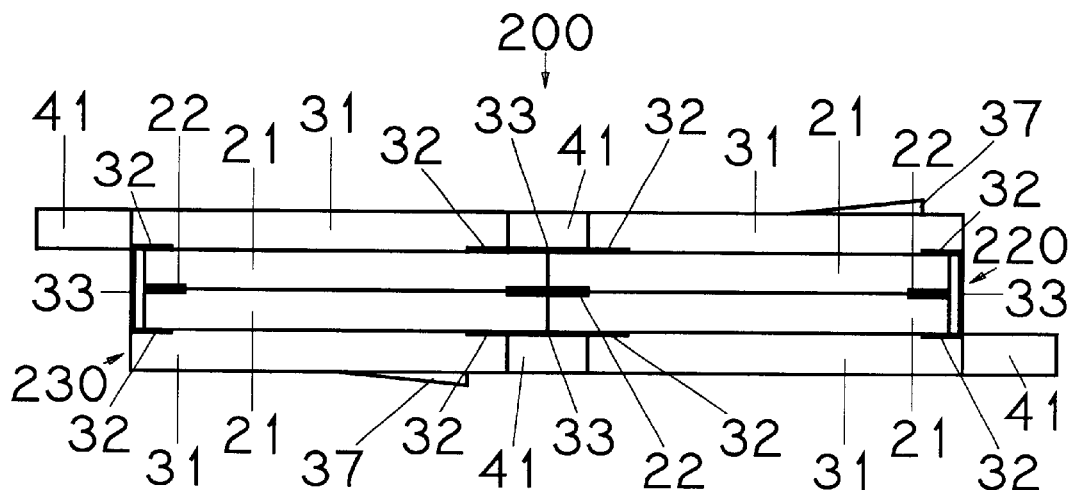
FIG. 9 is a rear view of the hood module in a folded state.

FIG. 9 is a rear view of the hood module 200 in a folded state. For an explanation purpose, FIG. 9 exaggeratedly shows thickness of the panels 21, the panels 31 and projection members 41. In order to make the double layer structure hood module 200 foldable, each of the hinges 32 has a light shielded play member 33.

In this embodiment, each length of the play member 33 must match a thickness of the inner hood 220 in a folded state, which is equal to the thickness of two panels 21, since the hinges 22 are inlayed in an inside of the panels 21 to form the entire inside surface uniform.

Figure 10:
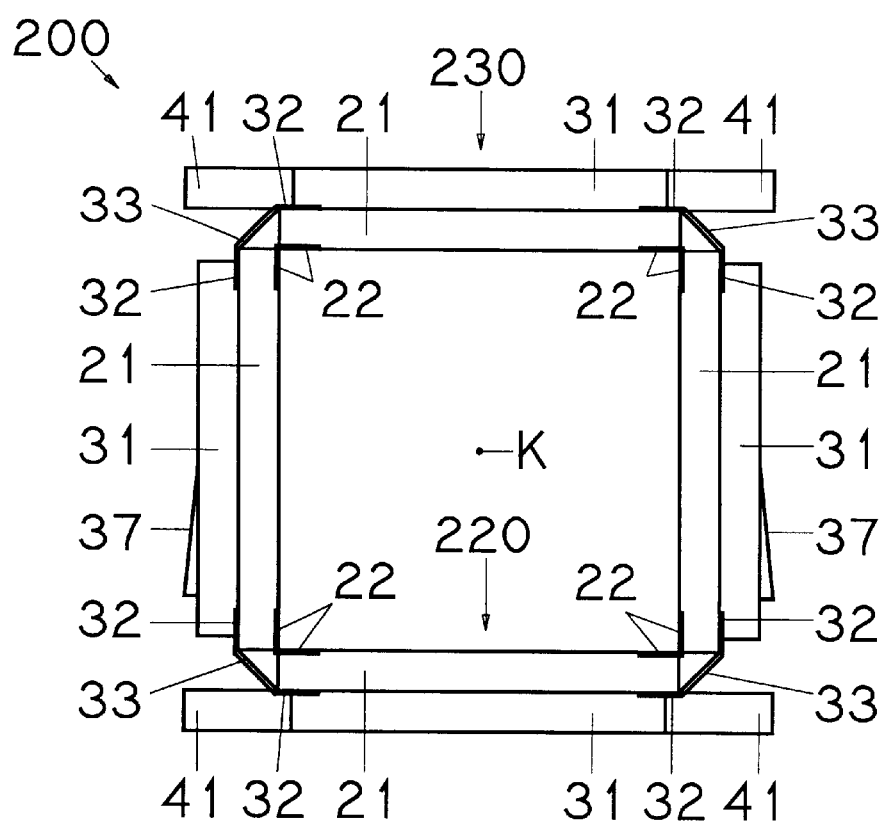
FIG. 10 is a rear view of the hood module in an open state.

FIG. 10 is a rear view of the hood module 200 in an open state. For the explanation purpose, FIG. 10 exaggeratedly shows the thickness of the panels 21, the panels 31 and projection members 41. In an open state, in order to make the outer hood 230 precisely fit the inner hood 220, a perimeter of an inside plane of the outer hood 230 must be equal to a perimeter of a contact plane of the inner hood 220 to the outer hood 230.

Thus, in this embodiment, because of a length of the play members 33, each edge length square to the optical axis K of the panels 31 must be shorter than that of the panels 21 where each difference is equal to the length of the play member 33 minus a distance between adjacent outside edge vertices of the panels 21 in an open state. In other words, if be each edge length square to the optical axis K of the panels 21 as M, and each thickness of the panels 21 as D, and each edge length square to the optical axis K of the panels 31 as N, the length of the play member 33 is 2D and the distance between the adjacent outside edge vertices of the panels 21 is equal to a product of D and square root of 2. And if the product is approximated as 1.4D, then, the difference is calculated as 2D−1.4D=0.6D. Thus, N is defined as N=M−0.6D.

As shown in FIG. 9, by this embodiment, as a folded state of the hood module 200, the perimeter of the inside plane of the outer hood 230 becomes larger than that of an outside plane of the inner hood 220. Thus, the double layer structure hood module 200 becomes foldable.

As shown in FIG. 3, each of the panels 21 has a rectangular shape depression 23 at the outside surface. This structure contributes for reduction of total thickness of the hood module 200 in a folded state by providing a movement space for each of the extension adjusts 500 while maintaining enough mechanical strength in an operation state.

As shown in FIG. 8, the facing two panels 31 respectively have long holes 35. Each lengthwise edge of the long holes 35 is equal in length to each edge square to the optical axis K of the depressions 23. When the inner hood 220 is aligned with the outer hood 230 at the rear side R edges, the long holes 35 are also aligned with the depressions 23 at the rear side R edges.

As shown in FIG. 3, each of the panels 21 has two friction bands 24 respectively placed at two inside edges of the depression 23 in parallel to the optical axis K.

Figure 11:
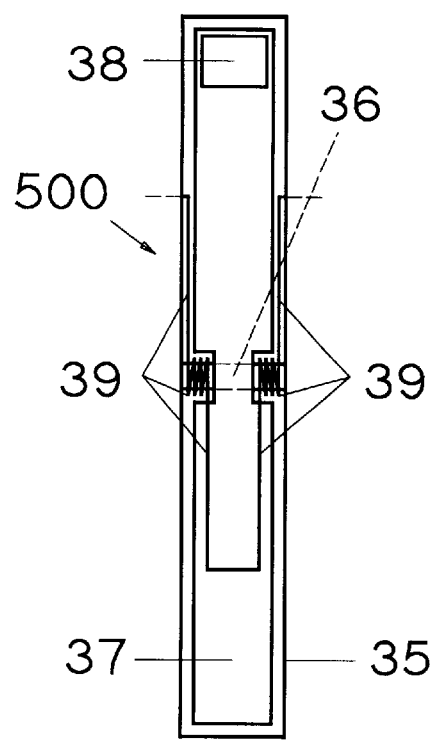
FIG. 11 is a rear view of the extension adjust viewed from the optical axis side.

FIG. 11 is a rear view of the extension adjust 500 viewed from the optical axis K side. For the explanation purpose, FIG. 11 shows the extension adjust 500 enlarged. Two of the extension adjusts 500 are respectively provided at two of the long holes 35. Each of the extension adjusts 500 comprises a long plate 37 that matches the long hole 35 in shape and has a friction plane 38 at one surface end, a rotation axis 36 placed at a center of the long plate 37 and an elastic member 39 that generates rotation force to the rotation axis 36.

Each of the extension adjusts 500 is pivotally connected at each center of the long holes 35 through each of the rotation axes 36 in parallel to the optical axis K as the friction plane 38 facing the friction band 24. Each of the elastic members 39 is built around each of the rotation axes 36 and is fastened at each of the panels 31.

Usually, each of the friction planes 38 contacts to each of the friction bands 24, thus, the hood extension length is secured, however, if a pressure is applied on another end of the long plate 37 toward the optical axis K against the rotation force of the elastic members 39, the frictional contact is disengaged, thus the outer hood 230 becomes slidable for the further hood length extension.

A pair of the friction planes 38 is facing each other, therefore, the hood extension adjust operation can be made by a single hand to slide by pushing each end of the long plates 37 at an opposite of the friction plane 38, and then to lock by releasing the hand.

As shown in FIG. 8, in this embodiment, the single hand operation can be made from a bottom side of the hood module 200, and the same hand operation can be made from top, right and left sides when 90 degree rotation of the hood module 200 is made for the attachment.

In order to prevent the outer hood 230 from separating from the inner hood 220 when the hood length extension is overly made, as shown in FIG. 8, two of derail stops 34 are respectively provided upper and lower panels 31 in the optical axis K side of the rear side R in such a way to interlock the panels 21 at each edge of the depressions 23 at the rear side R.

As shown in the FIG. 2 and FIG. 8, The outer hood 230 comprises two of projection members 41 respectively attaching to edges of upper and lower panels 31 at the front side F. In this embodiment, the projection member 41 is of a trapezoid shape.

In this embodiment, a profile of incoming light rays blocked by the opening of the outer hood 230 simulates a film aspect ratio for use, thus an excellent light shield capability is achieved.

At this embodiment, because the shape of the identical attachment interface is square, it is possible for the hood module 200 to attach to the adapter module 100 both in its horizontal and vertical positions. At a view camera, alternating a film holder placement to the camera at either horizontal or vertical positions makes a switching of a film aspect ratio. In this embodiment, the light shield capability is best achieved by 90 degree rotation of the hood module 200.

For achieving an excellent light shield capability, as another method, a rectangular hood opening matching a film aspect ratio could be used. Then, for the hood rotation, providing a set of guide means inside of the hood to form a square attachment interface is possible.

Figure 12:
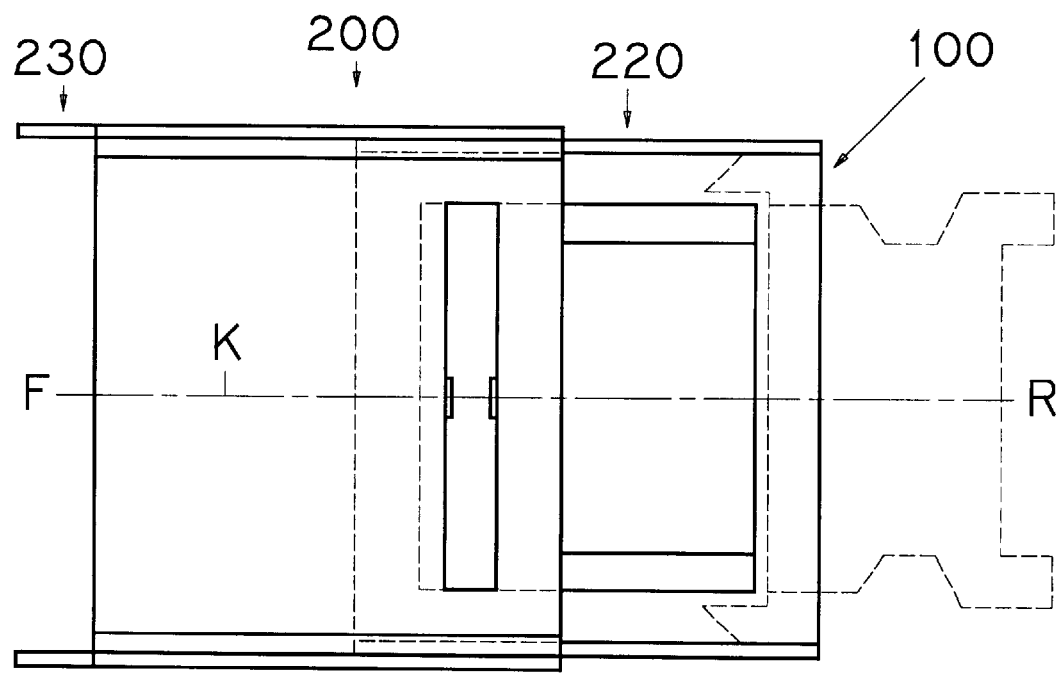
FIG. 12 is a side view of the hood module attached to the adapter module that is fastened to a lens.

FIG. 12 is a side view of the hood module 200 attached to the adapter module 100 that is fastened to a lens. The outer hood 230 is extended from the inner hood 220.

What is claimed is:

1. A lens hood comprising:
   (a) an adapter module having a circular hole through which a lens is continuously fastened;
   (b) an inner hood further comprising:
      (1) a plurality of first panels connected to each other along adjacent edges in a closed sequence; and
      (2) front and rear openings;
   (c) the inner hood which is foldable along the edges thereof; and
   (d) the inner hood which fits the adapter module for detachable attachment.

2. The lens hood of claim 1 further comprising:
   (a) an outer hood further comprising:
      (1) a plurality of second panels connected to each other along adjacent edges in the closed sequence; and
      (2) front and rear openings;
   (b) the outer hood which is foldable along the edges thereof; and
   (c) the outer hood which fits the inner hood to make a slidable double layer structure.

3. The lens hood of claim 2 wherein the outer hood further comprising:
   (a) a plurality of play members each of which is provided between each of the connected adjacent edges of the second panels for maintaining a gap as each length of the play members is equal to a thickness of the inner hood in an folded state; and
   (b) a plurality of the second panels each edge length square to the optical axis of which is defined as a perimeter of a contact plane of the inner hood to the outer hood is equal to a perimeter of an inside plane of the outer hood when the attachment is made.

4. The lens hood of claim 2 wherein the outer hood further comprising:
   (a) at least one extension adjust each further comprising:
      (1) a long plate;
      (2) a friction plane at one surface end of the long plate;
      (3) a rotation axis placed at a center of the long plate; and
      (4) an elastic member urging the rotation axis to rotate;
   (b) at least one long hole each of which is placed on each of the second panels square to the optical axis at the lens side; and
   (c) the rotation axis pivotally connected at a center of the long hole as the friction plane facing the optical axis and as the elastic member functioning with the second panel of the long hole.

5. The lens hood of claim 2 wherein the outer hood further comprising a plurality of projection members each provided on each edge of the second panels at the photographing object side.

6. The lens hood of claim 1 wherein the adapter module further comprising:
   (a) a plurality of tapered bodies each bent toward an optical axis and having a tip pointing toward a photographing object side and another end of the tip fastened to each vertex of the adapter module at a radial direction square to the optical axis; and (b) at least one hood lock each further comprising:
  (1) a first elastic member;
  (2) at least one lock pin each having an oblique section at a tip and mounted on the first elastic member in a same direction;
  (3) the first elastic member fastened at the optical axis side of the vertex of the adapter module as at least one of the lock pin each pointing toward a radial direction square to the optical axis and intersecting a plane configured by the vertices with the oblique section exposed to the photographing object side; and
  (4) at least one of the lock pin each of which pushes an inside wall of the inner hood by the first elastic member when the attachment is made and is released when the first elastic member is pulled back to an opposite direction.

7. The lens hood of claim 1 wherein the inner hood further comprising at least one depression occupying substantially major area of an outside surface of each of the first panels.

* * * * *